US006846171B2

(12) United States Patent
Herbert

(10) Patent No.: US 6,846,171 B2
(45) Date of Patent: Jan. 25, 2005

(54) HEAT TRANSFER ICE CREAM SCOOP

(75) Inventor: William J. Herbert, 7711 Westlake Blvd., Kent, OH (US) 44240

(73) Assignee: William J. Herbert, Kent, OH (US)

(*) Notice: Subject to any disclaimer, the term of this patent is extended or adjusted under 35 U.S.C. 154(b) by 164 days.

(21) Appl. No.: 10/245,486

(22) Filed: Sep. 16, 2002

(65) Prior Publication Data

US 2003/0113396 A1 Jun. 19, 2003

Related U.S. Application Data

(60) Provisional application No. 60/322,499, filed on Sep. 14, 2001, and provisional application No. 60/341,682, filed on Dec. 18, 2001.

(51) Int. Cl.[7] ................................................. A23G 9/04
(52) U.S. Cl. ...................................... 425/277; 426/279
(58) Field of Search ................................ 425/276–286; D7/681

(56) References Cited

U.S. PATENT DOCUMENTS

| | | | |
|---|---|---|---|
| 2,160,023 A | | 5/1939 | Kelly |
| 2,166,810 A | * | 7/1939 | Gammeter .................. 425/277 |
| 2,171,606 A | | 9/1939 | Shultz |
| 2,210,623 A | | 8/1940 | Kelly |
| 2,351,568 A | | 6/1944 | Wheaton |
| 2,560,900 A | | 7/1951 | Shultz |
| 2,926,620 A | | 3/1960 | Fried |
| 4,161,381 A | * | 7/1979 | Sciortino .................... 425/286 |
| 4,392,806 A | | 7/1983 | Houle |
| 4,427,702 A | | 1/1984 | Andrews |
| 4,544,085 A | | 10/1985 | Frazer |
| 4,553,921 A | | 11/1985 | Lamphere et al. |
| 4,699,582 A | | 10/1987 | Chen |
| 5,000,672 A | | 3/1991 | Halimi |
| 5,131,832 A | | 7/1992 | Budreau |
| 5,368,465 A | | 11/1994 | Wanderer |
| 5,837,296 A | | 11/1998 | Virkler |
| 5,848,637 A | | 12/1998 | Lee |
| 6,416,309 B1 | | 7/2002 | Michlitsch et al. |

FOREIGN PATENT DOCUMENTS

FR      2 744 596 A1    2/1996

OTHER PUBLICATIONS

Notification of Transmittal of the International Search Report and the International Search Report, dated Jan. 30, 2003, total of 7 pages.

* cited by examiner

Primary Examiner—James P. Mackey
Assistant Examiner—Donald Heckenberg
(74) Attorney, Agent, or Firm—Roger D. Emerson; Timothy D. Bennett; Brouse McDowell

(57) ABSTRACT

An ice cream scoop that optimizes the total heat capacity of the scoop by increasing the mass of the ice cream scoop and/or increasing the amount of liquid the ice cream scoop can hold there by creating a highly efficient ice cream scoop. A second embodiment of the present invention also allows for two methods of increasing the heat transfer from the heat source to the scoop portion. The first version utilizes a heat pipe that directs the heat flow directly to the location requiring the heat. The second version utilizes a highly conductive material that has a higher rate of conductivity than that of aluminum.

13 Claims, 3 Drawing Sheets

HEAT TRANSFER ICE CREAM SCOOP

This application claims priority from U.S. Ser. No. 60/322,499, entitled ICE CREAM SCOOP, filed Sep. 14, 2001 and U.S. Ser. No. 60/341,682, entitled HEAT TRANSFER FOR ICE CREAM SCOOP, filed Dec. 18, 2001.

I. BACKGROUND OF THE INVENTION

A. Field of Invention

This invention pertains to the art of methods and apparatuses for dispensing frozen products and more particularly to an ice cream scoop that incorporates an improved method and apparatus for transferring heat to the scoop portion of the ice cream scoop.

B. Description of the Related Art

It is well known that a common problem with dispensing frozen products is that the utensil used to dispense the frozen product requires significant force in order to remove the frozen product from the frozen product container. For example, when a user desires to remove frozen ice cream from an ice cream container, a utensil, such as a spoon or ice cream scoop, must be forced into and through the ice cream in order to remove a portion of ice cream. Because frozen ice cream is a "solid," it requires significant force to push the utensil through the ice cream. This significant force is especially required for frozen products considered "hard" because they are kept at a temperature significantly under the freezing temperature, e.g., ice cream is typically considered to be hard when kept at a temperature between 0 and −8° F. (Fahrenheit).

To reduce this problem, attempts have been made to heat the utensil beyond room temperature. By heating the utensil, the frozen product melts when contacted by the utensil thereby reducing the force necessary to move the utensil through the frozen product. However, known methods for heating such a utensil have largely proven to be unsatisfactory. The primary problem is in transferring sufficient heat to the portion of the utensil that contacts the frozen product (generally, the scoop portion).

One commonly known method for heating an ice cream scoop is to place the scoop (at least the scoop portion that contacts the frozen product) under a tap water source. The tap water source may provide water at a temperature above room temperature. A problem with this method is that there is insufficient heat capacity in the scoop to provide for a high scooping performance with hard ice cream or the time required to heat the entire ice cream scoop mass would be unduly long. In particular, such scoops lack the required mass of fluid and/or scoop material to establish the required heat capacity.

Another known method of heating an ice cream scoop is filling a hollow handle portion with a liquid such as water. U.S. Pat. No. 5,837,296 to Virkler, for example, discloses a hollow ice cream scoop and scoop portion that can be filled with warm water. This type of scoop allows the heat from the liquid to be transferred from the handle to the scoop portion thereby heating the scoop portion and ultimately melting the ice cream. However, Virkler does not teach the required values for heat capacity and thermal conductivity as discovered by applicant. Thus, Virkler does not teach the critical parameters required for high scooping performance with hard ice cream.

Another known method of heating an ice cream scoop is providing the scoop with a type of electrical heating portion. Such electrical heating portions include those powered by battery and thus powered by a typical home power outlet. Those powered by battery are well known to quickly lose the battery power. Those powered by a power outlet are expensive to manufacture and awkward to use.

It is also known to provide an ice cream scoop that is not intended to be heated. Instead, such a scoop may be sealed, with a defrosting fluid held within the handle. This type of scoop permits heat to be transferred from the handle (holding the fluid) to the scoop portion. This type of scoop doesn't heat the scoop portion but does keep it warmer than it would otherwise be without the defrosting fluid. However, as with many of the alternatives noted above, such scoops do not provide a sufficiently high scooping performance with hard ice cream.

Another known utensil, called a spade, is similar to the scoop having a defrosting fluid as noted above. The only difference is that whereas the previously noted scoop has a frozen product contacting portion that is scoop-like in design (typically a bowl shape) the spade has a frozen product contacting portion that is much flatter—spade-like in design. Such spades may also include a defrosting fluid in the handle but also fail to provide a sufficiently high scooping performance with hard ice cream.

The present invention provides methods and apparatuses for a new and improved ice cream scoop that is simple in design and overcomes the aforementioned disadvantages of limited thermal conductivity and limited heat capacity. The difficulties inherent in the art are therefore overcome in a way that is simple and efficient, while providing better and more advantageous results.

II. SUMMARY OF THE INVENTION

According to one aspect of the present invention, a new and improved ice cream scoop is provided that combines the optimum heat capacity and thermal conductivity of the material of the ice cream scoop to facilitate the removal of the frozen product from the ice cream container.

One advantage of this invention is that it increases the transfer of heat to the required portion of the ice cream scoop or utensil.

Another advantage of this invention is that the increased heat capacity allows the scoop portion to retain heat for a longer period of time.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

IV. DESCRIPTION OF THE PREFERRED EMBODIMENT

Figure 1:
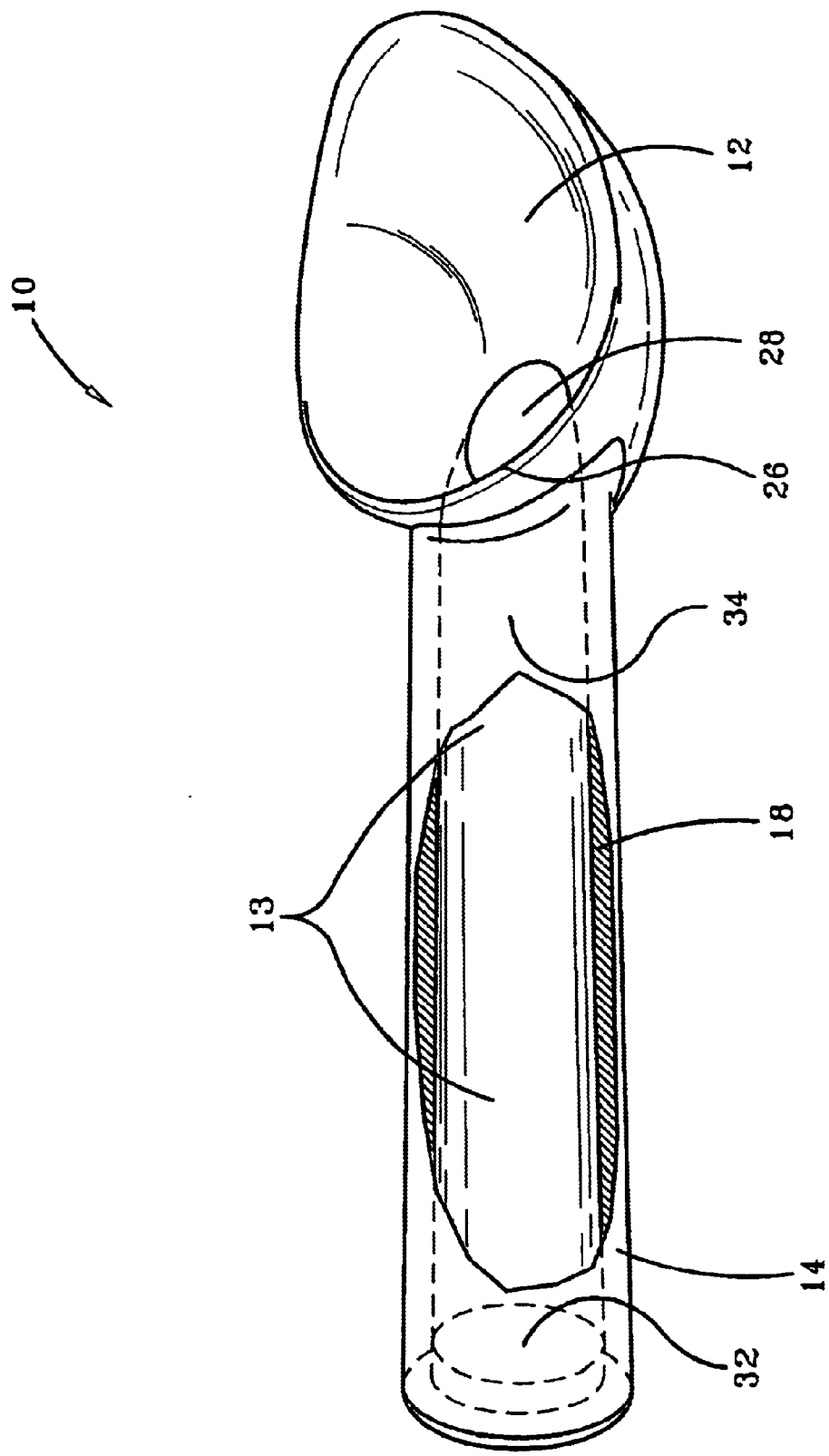
FIG. 1 is a perspective plan view of a first embodiment of the present invention.
Figure 2:
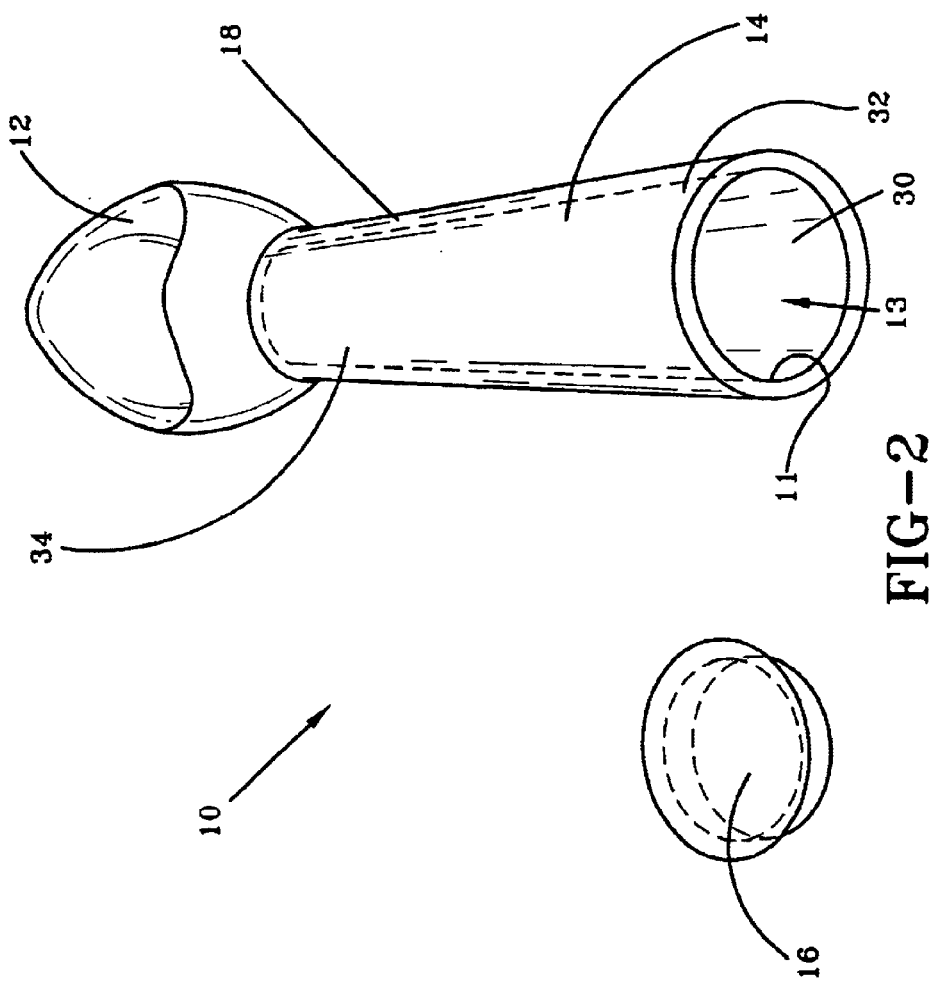
FIG. 2 is a perspective end view of the present invention as shown in FIG. 1 showing the end cap disconnected from the handle.

Referring now to the drawings wherein the showings are for purposes of illustrating a preferred embodiment of the invention only and not for purposes of limiting the same, FIGS. 1 and 2 show a first embodiment of the present invention. A utensil 10 includes a scoop portion 12, that is preferably bowl shaped, and is adapted to scoop a frozen product from a frozen product container. The utensil 10 also includes a handle 14 having first and second ends 34, 32 respectively. The first end 34 may be connected to the scoop portion 12 as shown. Of course the handle 14 may be connected to the scoop portion 12 in any manner chosen with sound engineering judgment. The handle 14 preferably includes a hollow portion 11 thereby creating a fluid retention region 13 adapted to receive an associated fluid, such as water. This utensil may also include a cap 16 that is selectively connectable to the second end 32 of the handle and adapted to enclose the associated fluid within the fluid retention region 13 of the handle 14. Importantly, it is not necessary that the cap 16 be located at the second end 32 of the handle 14. The cap 16 can be positioned anywhere on the handle 14 to protect an inlet and outlet opening into the fluid retention region 13 of the handle 14. The cap 16 may be attached to the handle using a threaded connection, a "slip fit" or any other method chosen with sound engineering judgment. It should be noted that while the particular utensil 10 shown is an ice cream scoop, the utensil 10 of this invention can be used to dispense other types of frozen products such as yogurt and other frozen products as well.

With continuing reference to FIGS. 1 and 2, the cap 16 may be removed from the handle 14 and the retention region 13 filled with a liquid such as room temperature water or above room temperature ("hot") water. It should be noted that any liquid chosen with sound engineering judgment can be used within the handle 14. The heat from the liquid is transferred conductively to the scoop portion 12 through the handle 14 material 18. Heat is also transferred conductively directly to the scoop portion 12 in the area where the fluid directly contacts the scoop portion 12.

Still referring to FIGS. 1 and 2, applicant has discovered that the combination of the total heat capacity, i.e., the calories available to melt the frozen product, and the thermal conductivity of the material 18 of the ice cream scoop 10 are critical to hard frozen product scooping performance. A primary disadvantage of known scoops is the failure to achieve the desirable combination of the total heat capacity and required thermal conductivity. Applicant has discovered that in order to have a highly efficient ice cream scoop 10, the total heat capacity of the ice cream scoop should be greater than 3,500 calories and the thermal conductivity of the material 18 should be at least 75 W/m-k. It is more preferred that the total heat capacity of the ice cream scoop should be greater than 4,000 calories and the thermal conductivity of the material 18 should be at least 95 W/m-k.

The total heat capacity (measured in calories) can be defined by the following equation:

$$\text{Total Heat Capacity } (THC) = (SH_s * M_s * \Delta T_s) + (SH_w * M_w * \Delta T_w)$$

Where:

$SH_s$=Specific heat of the ice cream scoop $M_s$=Mass of the ice cream scoop $\Delta T_s$=The temperature difference between the ice cream scoop and the ice cream $SH_w$=Specific heat of the water $M_w$=Mass of the water $\Delta T$=The temperature difference between the water and the ice cream Using the above formula, the total heat capacity for two leading brands of ice cream scoops (labeled Brands Z and H) were measured against four designs (labeled Design #1 though Design #4) of the present invention. The parameters for each type of ice cream scoop are defined in TABLE 1 and the results are tabulated in TABLE 2.

TABLE 1

Ice Cream Scoop Parameters

| Brand | $M_s$ (grams) | $M_w$ (grams) | $M_t$ (grams) | Specific Heat (cal/g/° C.) |
|---|---|---|---|---|
| Design #1 (aluminum scoop with fluid fillable handle) | 152 | 45 | 197 | 0.214 |
| Design #2 (plastic scoop with fluid fillable handle) | 90 | 58 | 148 | 0.239 |
| Design #3 (Brand Z modified for fluid fillable handle) | 130 | 35 | 165 | 0.214 |
| Design #4 | 217 | 35 | 262 | 0.214 |
| Brand Z | 130 | 35 | 165 | 0.214 |
| Brand H | 35 g-black polymer 96 g-white polymer | 0 | 131 | 0.300 |

NOTES:
1. The specific heat of water is 1.0 cal/g/° C.
2. Designs #1, #3, and #4 as well as Brand Z are made from aluminum which has a specific heat of 0.214 cal/g/° C. Design #2 is an all plastic body scoop.
3. Brand H is heated in a microwave in order to heat the scoop. Brand H does not hold water.
4. $M_t$ = Total mass It should also be noted that while the ice cream scoop 10 shown in FIGS. 1 and 2 is made of plastic, this is done for illustrative purposes only. The preferred material used to form the scoop portion 12 and the handle 14, can be metal or any other heat conductive material chosen with sound engineering judgment that meets the thermal conductivity requirement. Applicant has discovered that the required thermal conductivity should be at least 75 W/m-k. It is more preferred that the thermal conductivity be at least 95 W/m-k. Known materials meeting this requirement include some metals such as aluminum. The cap 16 need not be made of a material that meets the thermal conductivity requirement of the scoop portion and the handle.

TABLE 2

Ice Cream Scoop Heat Capacity

| Scoop | Water Temperature (° C.) | Heat Capacity (calories) | Thermal Conductivity (W/m-k) |
|---|---|---|---|
| Design #1 (aluminum scoop with fluid fillable handle) | 22 | 3024 | 95 |
| Design #1 (aluminum scoop with fluid fillable handle) | 52 | 4374 | 95 |
| Design #2 (plastic scoop with fluid fillable handle) | 52 | 4840 | 3.5 |
| Brand Z | 22 | 2449 | 109 |
| Design #3 (Brand Z modified for fluid fillable handle) | 52 | 3499 | 109 |
| Design #4 | 22 | 3566 | 95 |
| Design #4 | 52 | 4916 | 95 |
| Brand H (plastic scoop with microwave heating capability) | Heated in a microwave for 90 seconds | 1680 | less than 5 |

NOTES:
1. Designs #3 is a modified version of Brand Z. The brand was modified to achieve the desired heat capacity for experimental purposes.
2. The Thermal Conductivity unit is Watt/(Meter-Kelvin).

As illustrated in TABLE 2 the heat capacity of the ice cream scoop is dependent on the total mass of the scoop, mass of the water (if used), and the temperature of the water. Furthermore, TABLE 2 illustrates that of the eight scoops tested, only three of applicant's four designs meet the requirements of total heat capacity and thermal conductivity as explained above. Design #2 is a high heat capacity plastic scoop with low thermal conductivity in the base plastic scoop. This data and the scooping performance data in Table 3 illustrate that it is very critical when designing an ice cream scoop to optimize the total heat capacity of the scoop and also utilize relatively high thermal conductivity scoop materials to transfer the heat effectively for improved hard ice cream scooping performance. Therefore, increasing the mass of the ice cream scoop 10 and/or increasing the amount of liquid the ice cream scoop 10 contributes to a highly efficient ice cream scoop, as long as high thermal conductivity scoop materials are used. This can be achieved by increasing the volume of the fluid retention region 13 such as by increasing the length of the handle 14 or providing a tapered handle such that the second end 32 of the handle 14 has a larger diameter that the first end 34 of the handle 14. To achieve the required efficiency, applicant has discovered that the scoop should be adapted to provide a heat capacity of at least 3500 calories when the associated fluid is water at 52° C. More preferably, the scoop 14 should be adapted to provide a heat capacity of at least 4000 calories when the associated fluid is water at 52° C.

Using the data from TABLE 2 and the modifications applicant made to Brand Z, applicant made multiple performance tests of the ice cream scoops. The results of these tests were averaged and the average results are listed in TABLE 3 below.

109 grams, 106 grams, 82 grams, and 59 grams respectively, which is a 90% to 250% improvement over the commercial Brand Z scoop.

Figure 3:
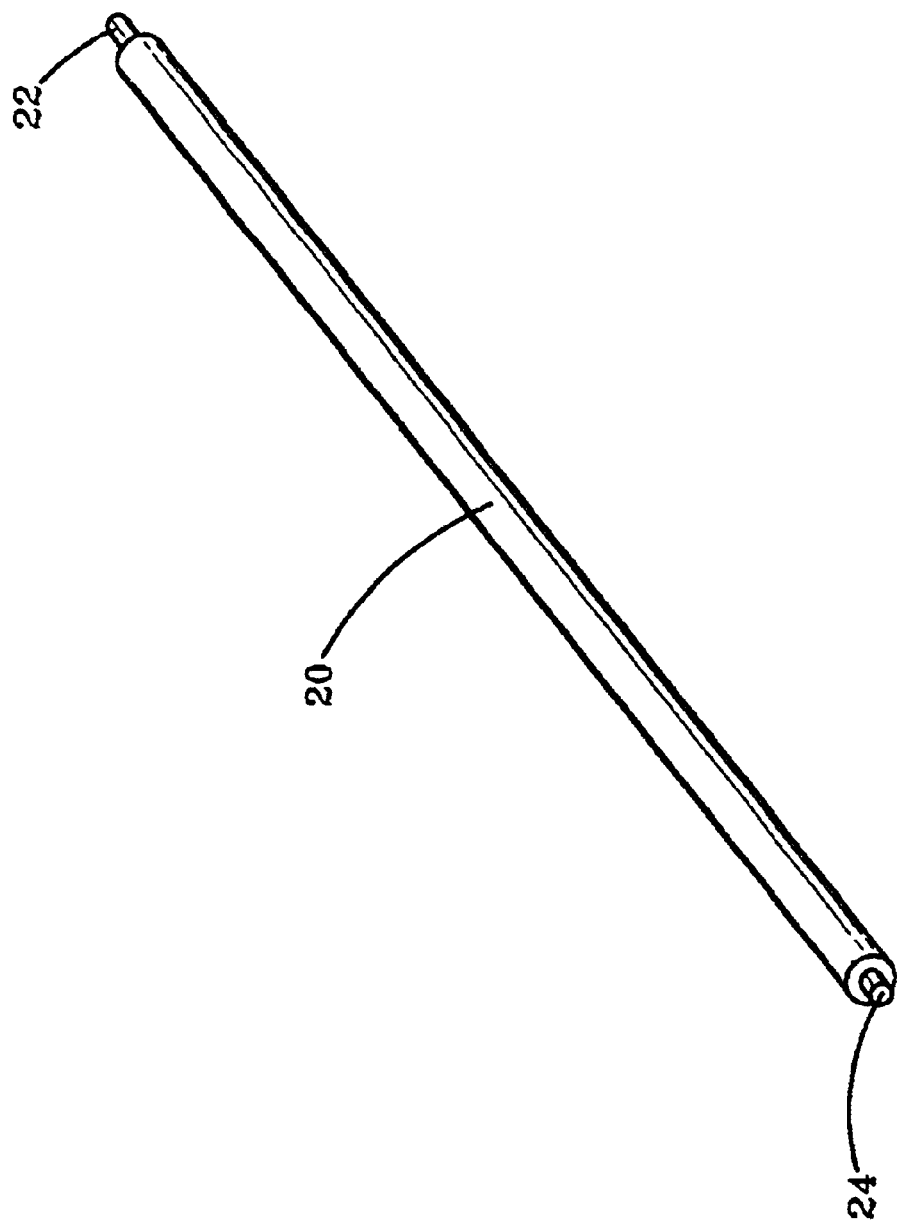
FIG. 3 is a plan view of a heat pipe used to assemble a second embodiment of the present invention.

FIG. 3 along with FIGS. 1 and 2 show one version of a second embodiment of the present invention. FIG. 3 shows a heat transfer member 20 consisting of a first end 22 and a second end 24. In the embodiment shown, the heat transfer member is heat pipe 20 but alternative heat transfer members are also possible as discussed further below. The heat pipe 20 is inserted into the handle 14 of the ice cream scoop 10 whereupon the first end 22 is further inserted into an aperture 28 at the base 26 of the scoop portion 12 to hold the heat pipe 20 in place during use. After the fluid retention region 13 is filled with hot or warm water, the cap 1 may be placed over the opening 30 at the end of the handle 14. However, it should be noted that a cap is not required. In other words, the fluid retention region 13 may be filled with fluid and then sealed. The heat transfer member 20 could still transfer heat from the fluid to the scoop portion 12. It should be noted that the heat pipe also removes heat from the handle 14 making the handle 14 easier to hold for the user.

Still referring to FIG. 3, the heat pipe 20 further consists of a wick structure (not shown) and a working fluid (not shown) that are internal to the heat pipe 20. In construction of the heat pipe 20 a vacuum is created inside the heat pipe 20 and then it is filled with a small quantity of a working fluid to saturate the wick structure. Therefore, the atmosphere within the heat pipe 20 consists of both the working fluid and vapor. As heat is applied to the heat pipe 20 the working fluid quickly vaporizes. Due to internal pressures, the heated vapor quickly travels to cooler parts of the heat

TABLE 3

Ice Cream Scoop Performance Test Results

| Scoop | Water Temperature (° C.) | Heat Capacity (calories) | Mass of Ice Cream (grams) | Scoop Portion Starting Temperature (° C.) | Ease of Use |
|---|---|---|---|---|---|
| Design #1 (aluminum scoop with fluid fillable handle) | 52 | 4374 | 106 | 36.7 | 9 |
| Design #2 (plastic scoop with fluid fillable handle) | 52 | 4840 | 22 | N/A | 3 |
| Design #4 | 52 | 4916 | 109 | 36.7 | 8–9 |
| Design #4 | 22 | 3566 | 82 | 22.8 | 7–8 |
| Design #3 (Brand Z modified for fluid fillable handle) | 52 | 3499 | 59 | 36.7 | 5–6 |
| Brand Z | 22 | 2449 | 31 | 22.2 | 4–5 |
| Brand H | 52 | 1722 | 39 | 37.2 | 2–3 |
| Brand H | 22 | 1532 | 18 | 22.2 | 2–3 |

The performance test results illustrate the importance of having the proper combination of total heat capacity and thermal conductivity. Note that designs #4 (heated water), #1 (heated water) and design #4 (unheated water) all meet the aforementioned criteria and are ranked first, second, and third respectively in the "ease of use" rating. The ease of use rating is simply a 1 to 10 (10 EASIEST TO SCOOP) subjective rating applicant used in comparing the performance of each scoop in scooping hard ice cream from an ice cream container. A rating of 1 would be terrible performance whereas a rating of 10 would be tremendous performance. It should be noted that this experiment was made with the ice cream at −6 degrees F. Note also that design #3 is a modified version of brand Z. Designs #4 (heated water), #1 (heated water), #4 (unheated water), and #3 (heated water) also produced the largest quantities of hard ice cream scooped at pipe where the vapor condenses thereby giving up its latent heat. The capillary forces in the wick pump the condensation back toward the heat source where the process is repeated. This continuous process transfers large quantities of heat at a rapid rate along the heat pipe thereby transferring a large amount of heat to the scoop portion 12 in a short amount of time. It should be further noted that the thermal conductivity of the heat pipe 20 can be as high as 20,000 times greater than that of copper as illustrated in TABLE 4 below.

The second version (not shown) of the second embodiment is similar to the first version in that a highly conductive means is inserted into the handle 14 portion of the ice cream scoop However, instead of inserting a heat pipe 20 into the handle 14, the inside diameter of the handle 14 is laced with an alternative heat transfer member such as copper or beryllium-copper that run from the end cap 16 to the base 26 of the scoop portion 12. This highly conductive material can transfer the heat from the heat source (in the fluid retention region 13) to the portion requiring the heat at a faster rate than aluminum.

To emphasize the importance of utilizing a heat pipe 20 or other conductive material in the handle 14, TABLE 4 below lists the thermal conductivity of aluminum, copper, and the heat pipe.

TABLE 4

THERMAL CONDUCTIVITY

| MATERIAL | THERMAL CONDUCTIVITY (W/m-k) |
|---|---|
| Aluminum (cast) | 95 |
| Copper | 375 |
| Heat Pipe | 1,500,000 to 7,500,000 |

It should be noted that either version of the second embodiment could be combined with the first embodiment to form a utensil with the desired heat capacity and a thermal conductivity higher than that of the first embodiment.

With the components of the present invention herein described, the operation of the ice cream scoop 10 will now be described. The user removes the end cap 16 and fills the handle 14 with hot or warm water through the opening 30. It should be noted that water temperature should not exceed the comfort level of the user. The user replaces the end cap 16 over the opening 30 to prevent water from spilling out of the handle 14. The user then grasps the handle 14 and uses the scoop portion 12 of the ice cream scoop 10 to remove the product from the package. In the event that the user wishes to use hot water an insulator (not shown) can be placed around the handle 14 of the present invention. It should be noted that the heat pipe 20 or the highly conductive material of the second embodiment are pre-installed by the manufacturer and no further installation of such devices is required by lie user.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A utensil comprising:
    a scoop portion adapted to scoop an associated frozen product;
    a handle operatively connected to the scoop portion, the handle having a fluid retention region adapted to receive an associated fluid;
    a cap that is selectively connectable to the handle and adapted to enclose the associated fluid within the fluid retention region of the handle;
    wherein the utensil is adapted to provide a heat capacity of at least 3500 calories when the associated fluid is water at 52° C.; and,
    wherein the scoop portion and the handle are formed of a material having a thermal conductivity of at least 75 W/m-k.

2. The utensil of claim 1, wherein the handle further comprises: an insulator attached to an outside diameter of the handle.

3. The utensil of claim 1, wherein the handle and scoop portions are made from a material having a thermal conductivity of at least 95 W/m-k.

4. The utensil of claim 1, wherein the utensil is adapted to provide a heat capacity of at least 4,000 calories when the associated fluid is water at 52° C.

5. The utensil of claim 1, further comprising:
    a heat transfer member adapted to transfer heat from the fluid retention region of the handle to the scoop portion, the heat transfer member being positioned within the handle.

6. The utensil of claim 5 wherein the heat transfer member is a heat pipe.

7. A utensil comprising:
    a scoop portion adapted to scoop an associated frozen product;
    a handle operatively connected to the scoop portion, the handle having a fluid retention region adapted to receive an associated fluid; and,
    a heat transfer member adapted to transfer heat from the fluid retention region of the handle to the scoop portion, the heat transfer member being positioned within the handle, wherein the heat transfer member is formed of copper and has a first end that contacts the scoop portion and second end that contacts the fluid retention region.

8. The utensil of claim 7, wherein the heat transfer member is formed of beryllium-copper.

9. A utensil comprising:
    a scoop portion adapted to scoop an associated frozen product;
    a handle operatively connected to the scoop portion, the handle having a fluid retention region adapted to receive an associated fluid; and,
    a heat transfer member adapted to transfer heat from the fluid retention region of the handle to the scoop portion, the heat transfer member being positioned within the handle, wherein the heat transfer member is a heat pipe and has a first end that contacts the scoop portion and second end that contacts the fluid retention region.

10. The utensil of claim 9, wherein the handle further comprises:
    an insulator attached to an outside diameter of the handle.

11. The utensil of claim 9, wherein the handle and scoop portions are made from a material having a thermal conductivity of at least 75 W/m-k.

12. The utensil of claim 7 further comprising: a cap that is selectivety connectable to the handle and adapted to enclose the associated fluid within the fluid retention region of the handle.

13. The utensil of claim 1, wherein the utensil is adapted to provide a heat capacity of at least 3,500 calories when the associated fluid is water at 22° C.

* * * * *